United States Patent [19]
Weinrich et al.

[11] 3,749,209
[45] July 31, 1973

[54] HYDRODYNAMIC BRAKING SYSTEM FOR APPLYING AN IMPACT-FREE BRAKING TORQUE TO A ROTATING MEMBER

[75] Inventors: Hellmut Weinrich, Zang; Johannes Peltner, Steinheim; Friedrich Helfer, Zang; Heinrich Dick; Fritz Haeberle, both of Heidenheim, all of Germany

[73] Assignee: Voith Getriebe KG, Heidenheim (Brenz), Germany

[22] Filed: Apr. 30, 1971

[21] Appl. No.: 139,047

[30] Foreign Application Priority Data
May 2, 1970 Germany............ P 20 21 543.4

[52] U.S. Cl.............................. 188/291, 192/12 A
[51] Int. Cl............................................. F16d 57/04
[58] Field of Search............... 188/290, 291, 296; 192/12 A; 60/54

[56] References Cited
UNITED STATES PATENTS
3,155,197  11/1964  Lee et al....................... 188/291 X
3,598,208  8/1971  Bronder....................... 188/290
3,146,630  9/1964  Ivey............................. 188/296 X Primary Examiner—George E. A. Halvosa
Attorney—Edwin E. Greigg

[57] ABSTRACT

In a hydrodynamic machine, to effect a rapid, yet impact-free braking of a rotating shaft, there is provided a braking system which includes a coupling means to connect the brake rotor of the hydrodynamic machine to said shaft. The coupling means includes a stepped brake piston having a small work face and a hydraulically separate large work face. In the first phase of the braking operation, the piston is rapidly actuated by exerting on said small work face a pressure generated by a continuously operated auxiliary pump. In the second phase of the braking operation, the said large work face of the stepped piston is exposed to a pressure which corresponds to the momentary outlet pressure of the hydrodynamic machine and which may be set by an arbitrarily controllable device forming part of said braking system.

14 Claims, 3 Drawing Figures

HYDRODYNAMIC BRAKING SYSTEM FOR APPLYING AN IMPACT-FREE BRAKING TORQUE TO A ROTATING MEMBER

BACKGROUND OF THE INVENTION

This invention relates to a hydrodynamic machine, such as a hydrodynamic converter, clutch or brake, having a toroidal work chamber, a first and a second vane wheel and further, an arbitrarily operable device for coupling the second vane wheel to, or disengaging it from a shaft to be braked. The last-named device comprises a locking piston which may be actuated by means of pressure fluid taken from the outer peripheral zone of the work chamber. The hydraulic fluid in that zone of the work chamber is under maximum pressure prevailing in the hydrodynamic machine. This pressure will be hereinafter referred to as "outlet pressure". The aforeoutlined hydrodynamic machine is further of the type which includes an auxiliary pump for supplying it with hydraulic work and control fluid.

In a known hydrodynamic machine of the above type (disclosed in German Pat. No. 1,032,109), which is designed as a converter and which forms part of a vehicle power plant and also serves as a brake, the aforenoted second vane wheel is constituted as the turbine wheel of the converter and may be coupled with the shaft to be braked, that is, with the output shaft of the power plant, through a planetary gearing. During the braking operation, the output shaft transmits the braking power through the turbine wheel to the hydraulic liquid within the work chamber. The liquid absorbs the braking power in the form of heat which is withdrawn from the hydrodynamic machine upon circulation of the liquid. For coupling the output shaft at the beginning of a braking operation to the turbine wheel operating as the brake rotor, the third free drive member of the aforementioned planetary gearing has to be immobilized. This is achieved by means of a friction brake comprising the aforenoted locking piston which, as mentioned before, may be exposed to the pressurized liquid which is taken from the work chamber of the hydrodynamic machine and which is under the outlet pressure. The reason for utilizing a liquid under the outlet pressure is based on the fact that the outlet pressure is a measure of the braking torque taken up by the turbine wheel and thus, in this manner, the force of the piston automatically adjusts itself to the braking torque. The result of this arrangement is that the coupling of the turbine wheel to the output shaft occurs relatively smoothly, i.e., without sharp impacts.

In view of the fact, however, that in the known machine designs the outlet pressure has only a small value during the operation preceding the braking, the stoppage of the said third drive member of the planetary gearing occurs only very slowly. Consequently, the braking of the converter occurs only with substantial delay. For this reason the known hydrodynamic machine which is used alternately for driving and for braking a vehicle, can be utilized in practice only in a limited manner. It is well known that because of safety considerations vehicle brakes have to respond immediately.

A solution to the aforenoted problem would appear to be the use, in the device for coupling the second vane wheel to the output shaft, of a pressurized fluid delivered directly from an auxiliary pump and operating the said piston rather than taking the pressurized fluid from the hydraulic work circuit. Such a solution, however, would require complex measures for limiting the force applied to the piston; otherwise the braking effect of the hydrodynamic machine would occur too suddenly and thus highly undesirable thrusts would be experienced.

OBJECT AND SUMMARY OF THE INVENTION

It is an object of the invention to provide an improved hydrodynamic machine of the aforenoted type wherein the coupling of the second vane wheel (used as the brake rotor) to the shaft to be braked occurs rapidly and yet free from impact to ensure, on the one hand, that the braking of the hydrodynamic machine occurs without delay and, on the other hand, that the braking operation does not start with a shock.

Briefly stated, according to the invention the locking piston is stepped and has two hydraulically completely separate work faces. One of the work faces is exposed to the pressurized fluid delivered by the auxiliary pump, while the other is exposed to the fluid taken from the work chamber and having a pressure corresponding to the momentary outlet pressure of the hydrodynamic machine.

The invention will be better understood, as well as further objects and advantages will become more apparent, from the ensuing detailed specification of several exemplary embodiments taken in conjunction with the drawing.

DESCRIPTION OF THE EMBODIMENTS

Figure 1:
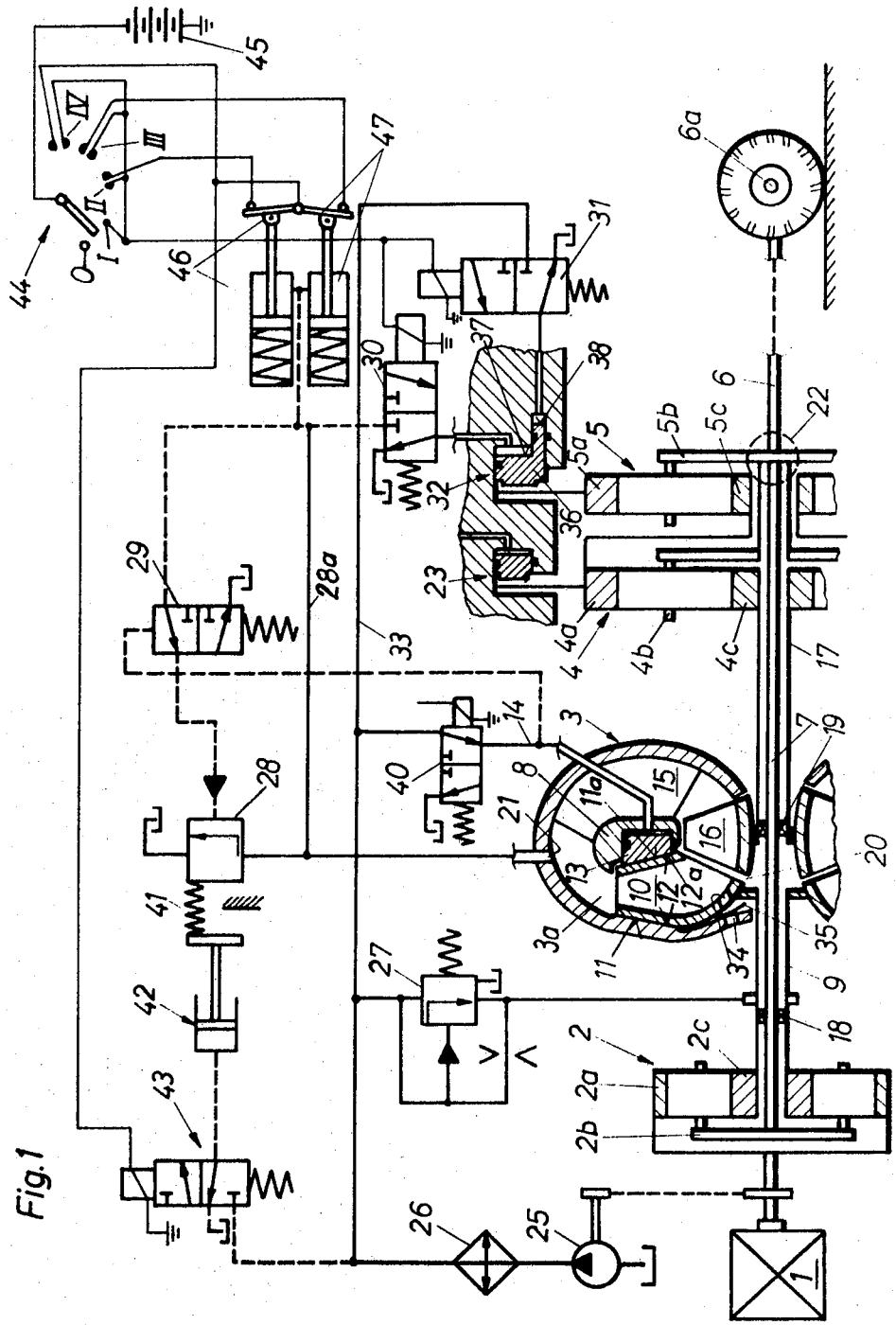
FIG. 1 is a schematic representation of a hydrodynamic converter for the driving and braking of a vehicle, associated with a braking system according to the invention.

Turning now to FIG. 1, there is schematically illustrated a vehicle engine 1 which drives the hollow wheel 2a of a planetary distributor gearing 2 which divides the driving power into a first or hydrodynamic power path and into a second or mechanic power path. The hydrodynamic power path emanating from the sun gear 2c of the planetary gearing 2 is applied to the output shaft 6 through a hydrodynamic converter 3 and a speed change assembly formed of planetary gearings 4 and 5 with the associated frictionally locked gear changing elements. The mechanic power path which emanates from the planetary gear carrier 2b of the planetary gearing 2 and which extends parallel to the first power path, is applied directly to the output shaft 6 by the shaft 7. The two power paths are reunited at the location indicated at 22. The output shaft 6 is connected with the driving axle 6a of the vehicle in ths usual manner.

The sun gear 2c of the planetary gearing 2 is connected with the pump wheel 10 of the converter 3 through a hollow shaft 9. The pump wheel 10 is provided at axially opposite sides with smooth friction faces 11 and 11a which repectively cooperate with a similarly shaped friction face 12 provided on the inside of the converter housing and with a friction face 12a of a piston 13 axially displaceable in the core ring 8 of the converter 3. By applying pressure to the piston 13 by means of admitting thereto pressurized fluid through the conduit 14, the pump wheel 10 is immobilized and thus, the hydrodynamic power path is blocked. In such a case, the entire power transmission occurs through the second or mechanic power path.

The hydrodynamic converter further comprises stationary guide vanes 15 which guide the work fluid accelerated by the pump wheel 10, to the turbine wheel 16. The converter illustrated is a so-called counterrotating converter in which, during normal operation (i.e., power transmission from the engine to the output shaft occurs through both the first and second power paths), the pump and turbine wheel rotate in opposite directions. The turbine wheel 16 is arranged at the inner circumference of the toroidal work chamber 3a; the hydraulic fluid flows therethrough axially causing a rotation of the turbine wheel 16 with very high rpm's. Converters of this type are particularly well adapted for practicing the invention.

The output torque of the converter 3 is transmitted by the turbine 16 to the planetary gearing 4 through a hollow shaft 17 coaxially surrounding the shaft 7 of the mechanic power path. The annular space between the shaft 7 and the hollow pump shaft 9 and between the shaft 7 and the hollow turbine shaft 17 are sealed by packings 18 and 19, respectively. Thus, hydraulic oil may be admitted to the converter through the annular channel between the two packings 18 and 19. The hydraulic oil enters the work chamber 3a between the pump wheel 10 and the turbine wheel 18, for example, at the location 20 which is at all times, that is, during either driving or braking operation, the location of lowest pressure in the converter 3. At the outer circumference of the work chamber 3a there is provided an outlet opening 21 for the work fluid. At this location during either driving or braking operation, there prevails the maximum value of the momentary pressure range existing inside the converter. This maximum pressure value is the outlet pressure referred to hereinbefore.

The planetary gearing 4, the sun gear 4c of which is directly connected with the turbine wheel 16 through shaft 17, transmits the torque of the hydrodynamic power path during forward travel. For this purpose, the hollow wheel 4a of the planetary gearing 4 has to be immobilized by means of brake 23. In this manner the planetary gear carrier 4b transmits the torque to the output shaft 6 rigidly coupled thereto.

For a reverse travel, the planetary gearing 5 is rendered operative. For this purpose the brake 23 is released and the brake 32 is energized for immobilizing the hollow wheel 5a of the planetary gearing 5. The turbine wheel 16 drives through the planetary gearing 4, the sun gear 5c of the planetary gearing 5, with the backward rotating hollow wheel 4a. The planetary gear carrier 5b of the planetary gearing 5 imparts a torque in the reverse traveling direction to the output shaft 6. The torque imparted by the planetary gear carrier 4b to the output shaft 6 is of reverse direction but is substantially smaller. By means of the reverse drive of the output shaft 6 and thus also of the shaft 7, the planetary gear carrier 2b rigidly connected to shaft 7 will also rotate in a reverse direction. It is, too, opposed by a torque directed contrary to the reverse direction but again, this last-named torque is substantially smaller than the output torque of the planetary gearing 5 operating in the reverse traveling direction. By means of the reverse rotation of the shaft 7 and the planetary gear carrier 2b, the sun gear 2c and thus the pump wheel 10 are accelerated.

The control system which is associated with the hydrodynamic machine and which is illustrated only to the extent necessary for understanding the braking operation, comprises the following components: An auxiliary pump 25 which is driven by the engine 1 and which supplies the hydrodynamic machine with work and control fluid, a cooler 26 in which heat is removed from the work fluid absorbed thereby during power transmission, but particularly during braking operation, a pressure limiting valve 27, the output of which is applied to the converter 3, a further, arbitrarily adjustable pressure limiting valve 28 connected to the outlet opening 21, and switch valves 29, 30, 31 and 40. The pressure limiting valve 28 comprises a symbolically indicated control piston which, on the one hand, is exposed to the force of an arbitrarily settable spring 41 and which, on the other hand, is exposed to the outlet pressure of the converter. The force of the spring operates in the valve closing direction, whereas the outlet pressure operates in the valve opening direction.

During driving operation in the forward traveling direction by means of power transmission over both the first and the second power paths (starting speed), all the switch valves are in their position of rest, that is, the valves 29 and 40 are in a position which is opposite to that shown in the drawing. In this manner, the pressure limiting valve 28 is closed (highest converter outlet pressure) despite a setting to the minimum value of the force of spring 41. In case the power transmission takes place exclusively through the mechanic power path (traveling speed), the valve 40 is actuated by a switch (not shown) as a function of the traveling speed and engine rpm for braking the pump wheel 10. Thereby the valve 29 is also actuated for opening the pressure limiting valve 28, so that the outlet pressure of the converter 3 assumes a minimum value corresponding to the lowest value of the force of spring 41. This operational condition, which is shown in FIG.1, prevails always when a braking operation is to begin because, in practice, the hydrodynamic machine is utilized for braking only in the upper speed ranges.

At the start of the braking operation the valves 30 and 31 are simultaneously actuated by means of a stepping switch 44, while the valves 40 and 29 remain in their position shown. As a result, the output pressure of the auxiliary pump 25, which prevails in conduit 33 and which is of a constant, relatively high value, is immediately applied to the small piston face 38 of the stepped piston 36 of the brake 32 and causes the latter to be brought very rapidly into a braking position which affects the rotation of the hollow wheel 5a of the planetary gearing 5. Due to the small area of the piston face 38, the braking of the hollow wheel 5a occurs smoothly rather than in an impact-like manner. At the time the piston 36 is so actuated, there is yet no appreciable pressure exerted on the large work face 37 of the piston 36. On the contrary, at that time a vacuum prevails at said work face, since the hydraulic oil, due to the flow resistance, constituted by the connecting conduits, follows the piston 36 relatively slowly. Also, the vacuum in the work chamber associated with the piston face 37 disappears with a certain delay, so that the coupling of the vane wheel 16 (brake rotor) to the shaft 6 through the planetary gearing 5 occurs not in an impact-like manner, but relatively slowly despite the aforenoted immediate assumption of the braking position of the piston 36. Stated in different terms, in the first phase of the braking operation, there is immediately present a small braking torque which is applied mainly by the inertia of the vane wheel 16 to be accelerated. Then, in the second phase of the braking operation, the desired full torque is gradually built up by exerting a force to the large work face 37 of piston 36 with the outlet pressure corresponding to the said full desired braking torque. In this manner the desired smooth increase of the braking torque to be applied to the shaft 6 is achieved.

The magnitude of the braking torque may be altered by adjusting the force of spring 41 of the pressure limiting valve 28 which is adapted to control the quantity of the hydraulic liquid flowing back from the work chamber 3a to the sump and thus to regulate the pressure in conduit 28a. Thus, by altering the arbitrarily selectable force of valve spring 41, the outlet pressure of the hydrodynamic machine 3 may be set to a desired value independently from the rpm of the brake rotor 16. Since the pressure increase of the hydraulic fluid inside the work chamber 3a — and thus also the braking torque — generated by the brake rotor 16 increases as a quadratic function of the brake rotor rpm, at the suction side of the vane wheel or brake rotor 16 there will prevail a pressure which is lower than the outlet pressure by the magnitude of pressure increase corresponding to the momentary brake rotor rpm. Since the outlet pressure is predetermined by the setting of the pressure limiting valve 28, it would seem that a vacuum may appear at the suction side of the brake rotor 16. In order to limit such a low pressure to an approximately atmospheric pressure, there are provided, preferably in the zone of the suction side of the brake rotor 16, inlet openings 34 through which air is drawn into the hydrodynamic machine 3. Stated differently, by maintaining the pressure constant at the pressure side of the brake rotor, the pressure at the suction side thereof also remains — at least approximately — constant as the rpm increases. The result is that the braking torque generated by the brake rotor is no longer dependent upon the engine rpm (i.e., traveling speed), but remains approximately constant which is an important advantage particularly in vehicle brakes. The phenomenon that the braking torque remains constant may also be explained by the fact that by drawing air through openings 34 there is formed in the work chamber 3a a liquid-air mixture, the weight of which — as the rpm increases — decreases in the same manner (i.e. quadratically) as the pressure increases.

The bias of the spring 41 is set by means of an auxiliary piston 42. Communication between the work chamber of the auxiliary piston 42 and the pressure outlet of the auxiliary pump 25 may be established or interrupted by means of a solenoid valve 43 having a control piston which has a very short period (less than one-tenth sec.) of response. In position I of the stepping switch 44, the valve 43 is in a de-energized condition. Accordingly, the auxiliary piston 42 is exposed to no pressure and thus the bias of spring 41 is quite slack and the pressure limiting valve 28, as in stage 0 of the stepping switch 44, is set to the lowest outlet pressure of the converter 3. The converter 3 — as set forth hereinabove — may draw air into the work chamber 3a through inlet openings 34 which may be closed by means of a flap valve 35 or through the packings 18 and 19 if these are so constructed that they let air pass in one direction.

In the position IV of the stepping switch 44 the solenoid valve 43 is coupled to a battery 45 and accordingly, the spring 41 obtains its strongest bias. Accordingly, the outlet pressure of the converter and therefore the braking torque are, in this switching position, at their highest value. The switching positions II and III serve for setting an intermediate value of the outlet pressure of the braking torque in a manner now to be described.

In position II of switch 44, in addition to valves 30 and 31, the valve 43 is also connected to the battery 45 indirectly through a pressure switch 46 which is actuated by the outlet pressure of the converter 3 and which has a very short period (less than one-tenth sec.) of response. In case the outlet pressure is greater than the opposing force of the spring contained in the pressure switch 46, the latter — which is closed in its normal position — opens and as a result, the valve 43 closes. Thus, the pressure prevailing theretofore in the pressure chamber of the piston 42 decreases, whereby the bias of spring 41 also drops and accordingly, the outlet pressure determined by the valve 28 is lowered. During this process a point will be reached when the force of the spring in the pressure switch 46 is greater than the opposing outlet pressure and then the switch is again closed so that the valve 43 is again opened and indirectly, by means of the increasing bias of the spring 41 of the valve 28, the outlet pressure is increased. Within the sensitivity of response of the pressure switch 46 and that of the solenoid valve 43, in this manner a continuous on-and-off switching takes place which has a frequency of approximately 10 – 30 cycles. By means of this continuous on-and-off switching of the solenoid valve 43, the pump pressure in the work chamber of the auxiliary piston 42 does not reach in each instance the full pump pressure, but instead, a mean pressure which corresponds to the pressure limit of the switch 46. Accordingly, the spring 41 has a lesser bias and also, the pressure limit of the valve 28 is lower. In the same manner, a second pressure switch 47 adjusted to a different pressure limit may, in stage III of the stepping switch 44, set another intermediate value of the outlet pressure.

Figure 2:
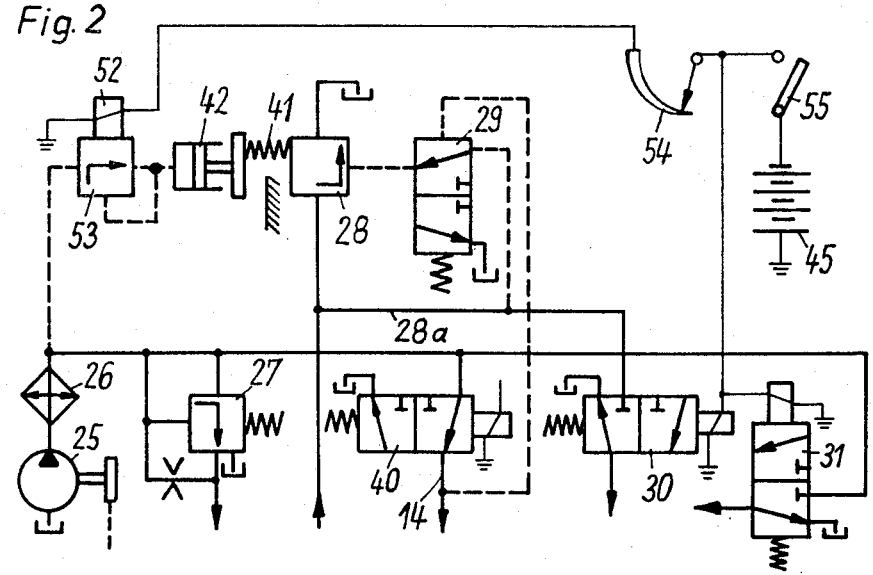
FIG. 2 is a schematic circuit diagram of a braking system modified with respect to that shown in FIG. 1, but applicable to the same hydrodynamic machine.

In FIG. 2, there is shown another embodiment of the control system according to the invention. The hydrodynamic machine which is associated with this control system may be identical to that of FIG. 1 and is therefore not shown in FIG. 2. Components shown in FIG. 2 that are identical to those of FIG.1 are identified with the same reference numerals. The two control systems differ from one another basically only in that the on-off solenoid valve 43 of FIG. 1 is replaced by a pressure regulating valve 53 which is controlled by means of an electromagnet 52, the magnetic force of which is variable by a control device 54. The pressure regulating valve 53 sets the pressure in the work chamber of the auxiliary piston 42, whereby — similarly to the embodiment of FIG. 1 — the force of spring 41 and thus the outlet pressure of the hydrodynamic converter and the braking torque are also determined. At the beginning of the braking operation, the switch 55 is to be closed and the control device 54 is to be set to the desired braking torque.

Figure 3:
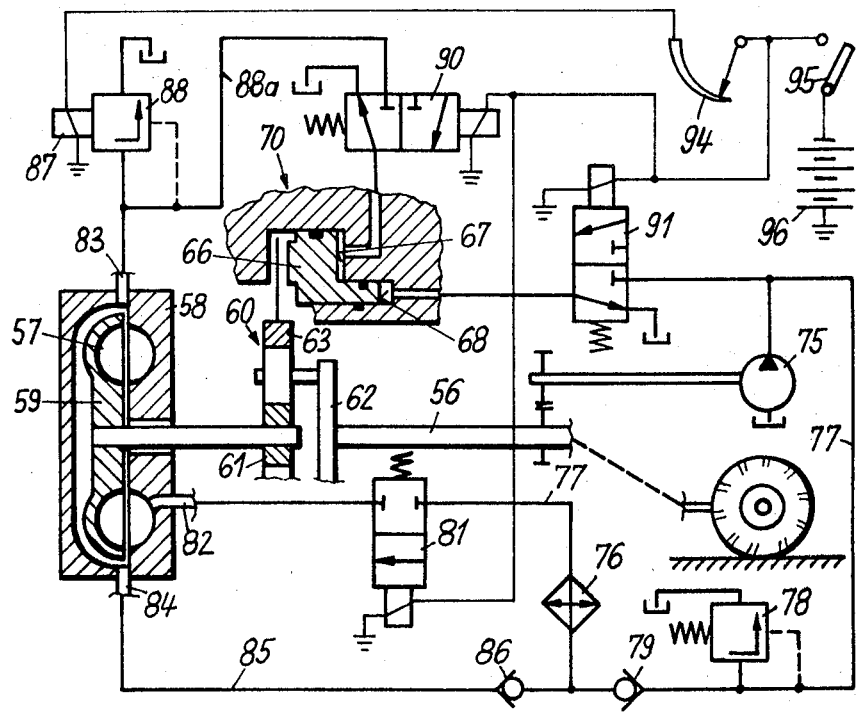
FIG. 3 is a schematic representation of a hydrodynamic brake associated with a braking system according to the invention.

Turning now to FIG. 3, the hydrodynamic brake shown therein comprises a stationary housing 58 which, with a brake rotor 59 defines a toroidal work chamber 57. With the brake rotor 59 there is rigidly connected the sun gear 61 of a planetary gearing 60, the planetary gear carrier 62 of which is keyed to the shaft 56 to be braked. The planetary gearing 60 includes a hollow wheel 63 which, for the braking operation, is frictionally engaged by a coupling device 70. The latter, according to the invention, includes an annular stepped piston 66 having a large work face 67 and a small work face 68. The provision of the planetary gearing 60 has an advantage over conventional clutches associated with hydrodynamic brakes in that the braking element, i.e., the piston 66, may be arranged in a stationary (i.e., non-rotating) component.

In most known hydrodynamic brakes, however, the brake rotor is keyed to the shaft to be braked and thus, when in a disengaged condition, rotates in the air-filled work chamber. The undesirable result is that the brake, even in its disengaged condition, consumes power. One way of eliminating such power consumption is to move into the work chamber baffle members which prevent therein the circulation of air. Such structures, however, are relatively complicated.

By providing a hydrodynamic brake with a system according to the invention, in the released condition of the brake the brake rotor is stationary and thus no power consumption takes place. As will be seen, similarly to the embodiment described in connection with FIG.1, the brake rotor is coupled to the shaft to be braked only at the beginning of the braking operation.

The control system of the hydrodynamic brake according to FIG. 3 comprises an auxiliary pump 75 which is driven by the shaft 56 to be braked and which serves for charging the work chamber 57 with hydraulic liquid and for supplying pressure medium through a solenoid valve 91 to the small work face 68 of the stepped piston 66. The charging conduit 77 includes a pressure limiting valve 78, a check valve 79, a cooler 76 and an on-off solenoid valve 81 and merges through an inlet 82 into the work chamber 57. The brake housing 58 comprises a first outlet 83 to which there are coupled a pressure limiting valve 88 which sets the outlet pressure and thus the braking torque, as well as the work chamber associated with the large work face 67 of the brake piston 66. Said work chamber communicates with the work chamber 57 through a solenoid valve 90 and a conduit 88a. The brake housing 58 is further provided with a second outlet 84 to which there is coupled the charging conduit 77 through the conduit 85 and the check valve 86 for forming a cooling circuit.

During normal operation as shown in FIG. 3, the hydrodynamic brake is disconnected. For a standby to the braking operation, the valves 81, 90 and 91 are energized whereby the work chamber 57 is charged with hydraulic liquid. As a result, the friction brake is, in the manner described in connection with FIG.1, actuated in an impact-free manner, whereupon the brake rotor 57 is caused to start revolving. The force which may be set at will in the pressure regulating valve 88 determining the outlet pressure of the hydrodynamic brake is generated directly with the aid of a variable magnetic force produced by the electromagnet 87 controllable by the device 94.

It is noted that a pressure limiting valve designed as described above may also find application in a control system according to FIG. 2. It would replace there the pressure limiting valve 28 whereby the spring 41, the auxiliary piston 42 and the pressure regulating valve 53 would also be omitted.

In the control system described, the valve 81 may be omitted in case a voiding of the work chamber 57 of hydraulic liquid in an inoperative condition is not desired. Such a solution may be effected without difficulty in the brake structure designed according to the invention.

What is claimed is:

1. In a hydrodynamic braking system of the type that includes (a) a hydrodynamic machine having a toroidal work chamber in which an outlet pressure is generated and a brake rotor, (b) a shaft to be braked, (c) coupling means for connecting said shaft to said brake rotor and (d) an auxiliary pump for delivering hydraulic liquid under pressure for operating and controlling said system, the improvement in said coupling means comprising, A. frictionally engageable means for transmitting a torque between said shaft and said brake rotor as a function of the extent of the frictional engagement, B. a reciprocable piston for effecting said frictional engagement, said piston having first and second work faces hydraulically separated from one another, C. first hydraulic conduit means for connecting said auxiliary pump with said first work face of said piston to expose said first work face to hydraulic pressure urging said piston in the direction of said frictionally engageable means, D. second hydraulic conduit means for connecting said work chamber of said hydrodynamic machine with said second work face of said piston to expose said second work face to said outlet pressure urging said piston in the direction of said frictionally engageable means, E. control means for controlling the admission of pressure to said first and second work faces of said piston, said control means including
  1. a pressure limiting valve contained in said second hydraulic conduit means for affecting the magnitude of said outlet pressure,
  2. arbitrarily adjustable means for setting the regulating force of said pressure limiting valve, said arbitrarily adjustable means including
    a. a spring forming part of said pressure limiting valve for supplying said regulating force as a function of the magnitude of bias of the spring,
    b. a displaceable auxiliary piston operatively connected to said spring for changing the bias thereof,
    c. means for admitting hydraulic pressure to said auxiliary piston for causing displacement thereof to change the bias of said spring, F. a hydraulic pressure source, G. a hydraulic cylinder containing said auxiliary piston, H. third conduit means for connecting said hydraulic pressure source to said hydraulic cylinder for applying a displacing force to said auxiliary piston, I. a pressure-regulating valve contained in said third circuit means and J. electromagnet means associated with said pressure-regulating valve for the control of the latter, said electromagnet means including means for varying the magnetic force generated thereby.

2. In a hydraulic braking system of the type that includes (a) a hydrodynamic converter forming part of the power plant of a vehicle, said converter having a toroidal work chamber in which an outlet pressure is generated and a brake rotor, (b) a shaft to be braked, (c) coupling means for connecting said shaft to said brake rotor and (d) an auxiliary pump for delivering hydraulic liquid under pressure for operating and controlling said system, the improvement in said coupling means comprising, A. frictionally engageable means for transmitting a torque between said shaft and said brake rotor as a function of the extent of the frictional engagement, B. a reciprocable piston for effecting said frictional engagement, said piston having first and second work faces hydraulically separated from one another, C. first hydraulic conduit means for connecting said auxiliary pump with said first work face of said piston to expose said first work face to hydraulic pressure urging said piston in the direction of said frictionally engageable means, D. second hydraulic conduit means for connecting said work chamber of said hydrodynamic converter with said second work face of said piston to expose said second work face to said outlet pressure urging said piston in the direction of said frictionally engageable means, E. control means for controlling the admission of pressure to said first and second work faces of said piston, F. a first vane wheel formed as the pump wheel of said hydrodynamic converter, G. a differential gearing connecting an output shaft of a vehicle engine forming part of said power plant to said pump wheel for transmitting a torque thereto in a first, hydrodynamic power path, H. mechanic means connected to said differential gearing for receiving a torque from said engine in a second mechanic power path, I. a second vane wheel constituting said brake rotor and also constituting the turbine wheel of said converter, J. a converter output shaft connected to said second vane wheel, K. an output member constituting said shaft to be braked; said output member connected to said converter output shaft and to said mechanic means for reuniting said first and second power paths, L. means operable at will for braking said pump wheel, M. a reversing gear means connected between said converter output shaft and said output member; said reversing gear means including
1. a planetary gearing for forward travel having a hollow wheel and
2. a planetary gearing for reverse travel having a hollow wheel, N. a first brake means associated with said planetary gearing for forward travel for braking the hollow wheel associated therewith and O. a second brake means associated with said planetary gearing for reverse travel for braking the hollow wheel associated therewith, said second brake means constituting said coupling means for connecting said shaft to be braked to said brake motor.

3. An improvement as defined in claim 2, wherein said control means includes a pressure limiting valve contained in said second hydraulic conduit means for affecting the magnitude of said outlet pressure; said improvement further includes a device connected to said pressure limiting valve for setting the latter to a maximum value of said outlet pressure during output torque transmission of said converter.

4. In a hydrodynamic braking system of the type that includes (a) a hydrodynamic machine having a toroidal work chamber in which an outlet pressure is generated and a brake rotor, (b) a shaft to be braked, (c) coupling means for connecting said shaft to said brake rotor and (d) an auxiliary pump for delivering hydraulic liquid under pressure for operating and controlling said system, the improvement in said coupling means comprising, A. frictionally engageable means for transmitting a torque between said shaft and said brake rotor as a function of the extent of the frictional engagement, B. a reciprocable piston for effecting said frictional engagement, said piston having first and second work faces hydraulically separated from one another, C. first hydraulic conduit means for connecting said auxiliary pump with said first work face of said piston to expose said first work face to hydraulic pressure urging said piston in the direction of said frictionally engageable means, D. second hydraulic conduit means for connecting said work chamber of said hydrodynamic machine with said second work face of said piston to expose said second work face to said outlet pressure urging said piston in the direction of said frictionally engageable means, E. control means for controlling the admission of pressure to said first and second work faces of said piston, said control means including
1. a pressure limiting valve contained in said second hydraulic conduit means for affecting the magnitude of said outlet pressure,
2. arbitrarily adjustable means for setting the regulating force of said pressure limiting valve, said arbitrarily adjustable means including
   a. a spring forming part of said pressure limiting valve for supplying said regulating force as a function of the magnitude of bias of the spring,
   b. a displaceable auxiliary piston operatively connected to said spring for changing the bias thereof,
   c. means for admitting hydraulic pressure to said auxiliary piston for causing displacement thereof to change the bias of said spring, F. a hydraulic pressure source, G. a hydraulic cylinder containing said auxiliary piston, H. third conduit means for connecting said hydraulic pressure source to said hydraulic cylinder for applying a displacing force to said auxiliary piston I. an on-off solenoid valve contained in said third conduit means for establishing and interrupting communication between said pressure source and said hydraulic cylinder, J. an electric current source and K. means for connecting said solenoid valve to, and disconnecting it from, said electric current source.

5. An improvement as defined in claim 4, wherein the last-named means includes a hydraulically operated switch having A. a switch-actuating reciprocable piston, B. a spring exerting a force on said switch-actuating piston in the switch-closing direction and C. means for exposing said switch-actuating piston to said outlet pressure in the switch-operating direction.

6. An improvement as defined in claim 5, wherein the last-named means includes a fourth hydraulic conduit means for connecting said switch-actuating piston to said work chamber of said hydrodynamic machine.

7. In a hydrodynamic braking system of the type that includes (a) a hydrodynamic machine having a toroidal work chamber in which an outlet pressure is generated and a brake rotor, (b) a shaft to be braked, (c) coupling means for connecting said shaft to said brake rotor and (d) an auxiliary pump for delivering hydraulic liquid under pressure for operating and controlling said system, the improvement in said coupling means comprising, A frictionally engageable means for transmitting a torque between said shaft and said brake rotor as a function of the extent of the frictional engagement, B a reciprocable piston for effecting said frictional engagement, said piston having first and second work faces hydraulically separated from one another, C first hydraulic conduit means for connecting said auxiliary pump with said first work face of said piston to expose said first work face to hydraulic pressure urging said piston in the direction of said frictionally engageable means, D second hydraulic conduit means for connecting said work chamber of said hydrodynamic machine with said second work face of said piston to expose said second work face to said outlet pressure urging said piston in the direction of said frictionally engageable means and E control means for controlling the admission of pressure to said first and second work faces of said piston, said control means including 1. starting means for initiating the braking operation of said hydrodynamic braking system, said starting means having an actuating position, 2. means connected to said first and second hydraulic conduit means and to said starting means for simultaneously establishing hydraulic communication between said auxiliary pump and said first work face of said piston through said first hydraulic conduit means and between said work chamber of said hydrodynamic machine and said second work face of said piston through said second hydraulic conduit means when said starting means assumes its said actuating position and 3. means for pressurizing said second face of said piston by the pressure generated in said work chamber with an automatic delay with respect to the pressurization of said first face of said piston by the pressure generated by said auxiliary pump.

8. An improvement as defined in claim 7, wherein the area of said first work face of said piston is smaller than that of said second work face.

9. An improvement as defined in claim 7, wherein said hydrodynamic machine is formed as a hydrodynamic brake having a bladed brake rotor and a bladed brake stator, the rotor and the stator defining said toroidal work chamber; the improvement further includes a planetary gearing having first, second and third gear members; said first gear member is fixedly connected with said brake rotor, said second gear member is fixedly connected with said shaft to be braked and said third gear member, constituting said frictionally engageable means, is disposed within the operating range of said piston and is brakable thereby.

10. An improvement as defined in claim 7, wherein said control means further includes A. a pressure limiting valve contained in said second hydraulic conduit means for affecting the magnitude of said outlet pressure, B. arbitrarily adjustable means for setting the regulating force of said pressure limiting valve and C. means defining an inlet opening in said work chamber of said hydrodynamic machine for permitting admission of air into said work chamber.

11. An improvement as defined in claim 10, wherein said arbitrarily adjustable means includes means for setting said force to a value corresponding to the value of smallest outlet pressure when no transmission of said torque takes place.

12. An improvement as defined in claim 10, wherein said arbitrarily adjustable means includes an electromagnet having means for varying the magnetic force generated thereby; said regulating force is adjusted by said magnetic force.

13. An improvement as defined in claim 10, wherein said arbitrarily adjustable means includes A. a spring forming part of said pressure limiting valve for supplying said regulating force as a function of the magnitude of bias of the spring, B. a displaceable auxiliary piston operatively connected to said spring for changing the bias thereof and C. means for admitting hydraulic pressure to said auxiliary piston for causing displacement thereof to change the bias of said spring.

14. An improvement as defined in claim 13, including

A. a hydraulic pressure source,

B. a hydraulic cylinder containing said auxiliary piston,

C. third conduit means for connecting said hydraulic pressure source to said hydraulic cylinder for applying a displacing force to said auxiliary piston and D. an on-off valve contained in said third conduit means for establishing and interrupting communication between said pressure source and said hydraulic cylinder.

* * * * *